United States Patent
Zhang et al.

(10) Patent No.: US 10,356,160 B2
(45) Date of Patent: Jul. 16, 2019

(54) METHODS AND DEVICES FOR ACQUIRING USER INFORMATION

(71) Applicant: Xiaomi Inc., Beijing (CN)

(72) Inventors: Pengfei Zhang, Beijing (CN); Heng Qu, Beijing (CN); Yongfeng Xia, Beijing (CN); Yidong Wang, Beijing (CN)

(73) Assignee: XIAOMI INC., Haidian District, Beijing (CN)

( * ) Notice: Subject to any disclaimer, the term of this patent is extended or adjusted under 35 U.S.C. 154(b) by 0 days.

(21) Appl. No.: 14/737,456

(22) Filed: Jun. 11, 2015

(65) Prior Publication Data

US 2016/0112498 A1    Apr. 21, 2016

Related U.S. Application Data

(63) Continuation of application No. PCT/CN2015/074619, filed on Mar. 19, 2015.

(30) Foreign Application Priority Data

Oct. 20, 2014 (CN) .......................... 2014 1 0559677

(51) Int. Cl.
*H04L 29/08* (2006.01)
*H04W 4/021* (2018.01)
(Continued)

(52) U.S. Cl.
CPC .............. *H04L 67/10* (2013.01); *H04B 1/385* (2013.01); *H04L 67/18* (2013.01); *H04L 67/26* (2013.01);
(Continued)

(58) Field of Classification Search
CPC .......... H04L 67/10; H04L 67/18; H04L 67/26; H04L 67/42; H04L 67/12; H04W 4/008;
(Continued)

(56) References Cited

U.S. PATENT DOCUMENTS

| | | | | |
|---|---|---|---|---|
| 2014/0240122 A1* | 8/2014 | Roberts | ................. | G16H 40/63 340/539.11 |
| 2014/0244009 A1* | 8/2014 | Mestas | ............... | A63B 24/0062 700/91 |

FOREIGN PATENT DOCUMENTS

| | | |
|---|---|---|
| CN | 102811179 A | 12/2012 |
| CN | 103152704 A | 6/2013 |

(Continued)

OTHER PUBLICATIONS

Beach A et al, "Touch Me Wear: Getting Physical with Social Networks", 2009. CSE '09. International Conference on Computational Science and Engineering, Aug. 29, 2009, pp. 960-965, IEEE, Piscataway, NJ, USA.

(Continued)

*Primary Examiner* — Tauqir Hussain
(74) *Attorney, Agent, or Firm* — Jun He Law Offices P.C.; James J. Zhu

(57) ABSTRACT

The present disclosure relates to a method for acquiring user information in a terminal device for acquiring user information and a terminal device thereof, and a method for acquiring user information in a server and a server thereof. The method includes: receiving acquisition information uploaded by a first wearable device bound. Herein the acquisition information comprises an identifier for identifying a second wearable device detected by the first wearable device; uploading the acquisition information to a server; receiving the user information pushed by the server. Herein the user information is obtained by the server according to the identifier and is associated with the acquisition information; and performing a processing operation according to the user information.

12 Claims, 9 Drawing Sheets

(51) Int. Cl.
  *H04B 1/3827* (2015.01)
  *H04W 76/14* (2018.01)
  *H04W 4/80* (2018.01)
  *H04L 29/06* (2006.01)
  *H04W 8/00* (2009.01)

(52) U.S. Cl.
  CPC ............ *H04L 67/42* (2013.01); *H04W 4/021* (2013.01); *H04W 4/80* (2018.02); *H04W 8/00* (2013.01); *H04W 76/14* (2018.02); *H04L 67/12* (2013.01); *H04W 8/005* (2013.01)

(58) Field of Classification Search
  CPC ..... H04W 4/021; H04W 8/005; H04W 8/205; H04W 76/023; H04B 1/385
  USPC ........................................................ 709/204
  See application file for complete search history.

(56) References Cited

FOREIGN PATENT DOCUMENTS

| | | |
|---|---|---|
| CN | 103190990 A | 7/2013 |
| CN | 103490990 A | 1/2014 |
| CN | 103686680 A | 3/2014 |
| CN | 103716921 A | 4/2014 |
| JP | 2004056744 A | 2/2004 |
| JP | 2009131928 A | 6/2009 |
| JP | 2013020422 A | 1/2013 |
| JP | 2014134923 A | 7/2014 |
| JP | 2014186731 A | 10/2014 |

OTHER PUBLICATIONS

Marije Kanis et al, "Toward wearable social networking with iBand", Conference Proceedings of CHI 2005, Apr. 2, 2005, pp. 1521-1524, Portland, Oregon, USA.

Beach A et al, "WhozThat? evolving an ecosystem for context-aware mobile social networks", IEEE Network, Jul. 1, 2008, pp. 50-55, IEEE Service Center, New York, NY, US.

International Search Report and Written Opinion of PCT/CN2015/074619 .

Extended European Search Report of EP15183679.8.

Japanese Office Action of JP2016-554795.

Korean Office Action of KR10-2015-7027023.

First Office Action for Chinese Application No. 201410559677.9 dated May 31, 2017.

* cited by examiner

METHODS AND DEVICES FOR ACQUIRING USER INFORMATION

CROSS-REFERENCE TO RELATED APPLICATIONS

This application is a Continuation application of International Application No. PCT/CN2015/074619, filed with the State Intellectual Property Office of P. R. China on Mar. 19, 2015, which is based upon and claims priority to Chinese Patent Application No. 201410559677.9, filed on Oct. 20, 2014, the entire contents of which are incorporated herein by reference.

TECHNICAL FIELD

The present disclosure generally relates to the field of terminal devices, and more particularly, to a method for acquiring user information in a terminal device and the terminal device thereof, and a method for acquiring user information in a server and the server thereof.

BACKGROUND

With the development of mobile Internet, a generation of social networking applications (e.g., an instant messaging application) ensures that communication between people is becoming fast and diverse. In order to prevent loss of users of the social networking applications, various social networking applications provide a function of recommending users, whom a user may be interested in are recommended to the user. However, a conventional user recommending method mainly depends on personal information disclosed by the user to recommend other users. Thus, the accuracy of the recommendation is limited.

SUMMARY

According to a first aspect of embodiments of the present disclosure, there is provided a method for acquiring user information in a terminal device, including: receiving acquisition information uploaded by a first wearable device bound to the terminal device, herein the acquisition information comprises an identifier for identifying a second wearable device detected by the first wearable device; uploading the acquisition information to a server; receiving the user information pushed by the server, herein the user information is obtained by the server according to the identifier and is associated with the acquisition information; and performing a processing operation according to the user information.

According to a second aspect of embodiments of the present disclosure, there is provided a method for acquiring user information in a server, including: receiving pieces of acquisition information uploaded by a terminal device, herein the pieces of acquisition information comprise identifiers for identifying other wearable devices detected by a wearable device bound to the terminal; querying for the user information according to the identifiers for identifying the other wearable devices; pushing the user information to the terminal device.

According to a third aspect of embodiments of the present disclosure, there is provided a terminal device for acquiring user information, including: a processor; and a memory for storing instructions executable by the processor. The processor is configured to perform: receiving acquisition information uploaded by a first wearable device bound to the terminal device, herein the acquisition information comprises an identifier for identifying a second wearable device detected by the first wearable device; uploading the acquisition information to a server; receiving the user information pushed by the server, wherein the user information is obtained by the server according to the identifier and is associated with the acquisition information; and performing a processing operation according to the user information.

According to a fourth aspect of embodiments of the present disclosure, there is provided a server for acquiring user information, including: a processor; and a memory configured to store instructions executable by the processor. The processor is configured to perform: receiving pieces of acquisition information uploaded by a terminal device, herein the pieces of acquisition information comprise identifiers for identifying other wearable devices detected by a wearable device bound to the terminal; querying for the user information according to the identifiers for identifying the other wearable devices; pushing the user information to the terminal.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings where the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one or all possible combinations of one or more associated listed items.

It should be understood that, although terms such as "first", "second" and "third" are used herein for describing various information, these information should not be limited by these terms. These terms are only used for distinguishing the same type of information. For example, first information may also be called second information, and similarly, the second information may also be called the first information, without departing from the scope of the present disclosure. As used herein, the term "if" may be construed to mean "when" or "upon" or "in response to determining", that a stated condition precedent is true, depending on the context.

Figure 1:
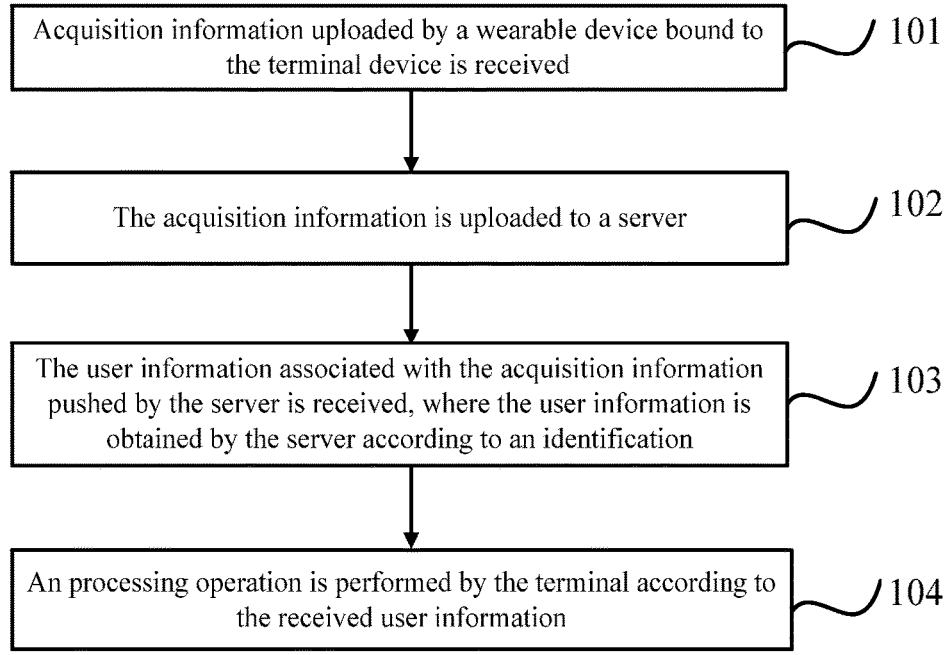
FIG. 1 is a flow chart of a method for acquiring user information according to an exemplary embodiment of the present disclosure.

FIG. 1 is a flow chart of a method for acquiring user information according to an exemplary embodiment of the present disclosure. The method for acquiring user information may be applied in a terminal device. The terminal device may be a smart phone and the like. The method for acquiring user information may include following steps.

In step 101, acquisition information uploaded by a wearable device bound to a terminal device (e.g., a first wearable device) is received.

In this embodiment, communication between wearable devices and a binding between a wearable device and a terminal device may be realized by a short distance wireless communication technology. For example, a wireless connection between the wearable devices may be established by NFC (Near Field Communication) technology, blue tooth technology, or WIFI technology or the like, and then the wearable devices may discover and detect each other based on the established wireless connection. The wearable device may communicate with client software preinstalled on the terminal device via the wireless connection, so as to establish a binding relationship with the terminal device.

When detecting a second wearable device, the first wearable device may obtain acquisition information of the second wearable device and the acquisition information may comprise a hardware ID of the second wearable device detected by the first wearable device, or geographic location information of the first wearable device when the second wearable device is detected. The hardware ID is configured to identify the second wearable device uniquely, and an identifier of the second wearable device may be identified according to the hardware ID. For example, in practice, the hardware ID may be a discrete value generated by calculating and sampling a MAC address of the second wearable device. The geographic location information of the first wearable device when the second wearable device is detected may be obtained according to a positioning chip provided in the first wearable device.

In this embodiment, the first wearable device may further determine whether it is necessary to upload the acquisition information of the second wearable device to the terminal device by judging whether the distance between the first wearable device and the detected wearable device is less than a predetermined distance when the second wearable device is detected. For example, if the distance between the first wearable device and the detected wearable device is less than the predetermined distance, the acquisition information of the detected wearable device may be uploaded to a server. Conversely, if the distance between the first wearable device and the detected wearable device is greater than the predetermined distance, the acquisition information of the detected wearable device may not be uploaded. Pieces of the acquisition information of the same wearable device detected at different positions or different time may be uploaded repeatedly. The predetermined distance is not specifically limited herein.

In step 102, the acquisition information is uploaded to a server.

In step 103, the user information associated with the acquisition information pushed by the server is received. Herein the user information is obtained by the server according to an identifier.

In this embodiment, acquisition information of each wearable device may be previously associated with corresponding user information in the server. The server may query for the user information associated with the acquisition information according to the identifier (such as the hardware ID) of the second wearable device and then may push the queried user information to the terminal device.

For example, the user information may include a social account of a user of the second wearable device and personal information disclosed by the user of the second wearable device via a social application. The server establishes an association relationship between the acquisition information and the user information by authorizing the user of the second wearable device to log in the client software in the second wearable device via the social account. If the user of the second wearable device logs in the client software in the second wearable device successfully via the social account, the server locally stores an association relationship between the social account and the client software in the second wearable device. Once the association relationship between the social account and the client software in the second wearable device is established, the server may obtain the personal information (such as a personal picture, personal data, etc.) disclosed on the social software by the user of the second wearable device from a related server device according to the identifier (such as the hardware ID) of the second wearable device, and may push the obtained user information to the terminal device.

Of course, other methods of obtaining the user information associated with the acquisition information from the server may be realized, which are not described in detailed herein.

In this embodiment, the server may also filter pieces of the acquisition information according to a predetermined algorithm and extract an identifier corresponding to the predetermined algorithm when querying for the user information associated with the acquisition information according to the identifier of the other wearable devices.

For example, since the terminal device uploads pieces of the acquisition information of the same wearable device detected at different positions or different time repeatedly and a number of times of any one of the pieces of the acquisition information being repeatedly uploaded is the number of times the corresponding wearable device being detected. The server may calculate the number of times an identifier in each piece of the received acquisition information being repeatedly uploaded and determine whether the number of times of the identifier in each piece of the received acquisition information being repeatedly uploaded reaches a predetermined threshold, such as three times, when filtering the received acquisition information. If it is determined that the number of times an identifier in a piece of the acquisition information being repeatedly uploaded reaches the predetermined threshold, the piece of the acquisition information is extracted as a filtering result.

At this time, the filtering result comprises the acquisition information of such a wearable device that the number of times it being detected reaches the predetermined threshold. The acquisition information is the acquisition information of the wearable device that the user often encounters.

In step 104, a processing operation is performed by the terminal device according to the received user information.

In this embodiment, the terminal device may perform the processing operation according to the user information after receiving the user information pushed by the server. For example, the terminal device may provide a user recommendation or perform a data analysis according to the user information.

The terminal device may perform the processing operation in different applications when performing the operation according to the user information.

For example, take providing a user recommendation according to the user information as an example, if the user information comprises the social account of the user of the second wearable device and personal information disclosed by the user of the second wearable device in the social application, the terminal device may define the user information as "people who is often encountered" and may recommend the user information in the social application corresponding to the social account or the client software in the first wearable device to the user of the first wearable device.

On one hand, assuming that the social account is an account of the instant communication software "MiLiao", the terminal device may recommend the user of the second wearable device as "people who is often encountered" to the user of the first wearable device via the "MiLiao" software locally stored in the terminal device after receiving the user information of the second wearable device pushed by the server, or may recommend the user of the second wearable device as "special someone" to the user of the first wearable device in a situation that the user of the second wearable device is a friend of the user of the first wearable device.

On the other hand, after the terminal device receives the user information of the second wearable device pushed by the server, since the user information is associated with the acquisition information, the terminal device may recommend the user of the second wearable device to the user of the first wearable device by defining the user of the second wearable device as "people who is often encountered" in the client software locally installed in the first wearable device.

In addition, in practice, since the acquisition information further comprises geographic location information of the wearable device bound to the terminal device when a surrounding wearable device is detected, the server may further push the geographic location information to the terminal device actively, such that the terminal device may display the geographic location information as "an encounter position" in addition to the above user information of the surrounding wearable device when providing the user recommendation in the social software or the client software in the wearable device bound to the terminal device.

In the above embodiment, by receiving acquisition information uploaded by a bound wearable device, uploading the acquisition information to a server, querying for the user information associated with the acquisition information by the server, and pushing the queried user information to the terminal device, the terminal device may realize a more effective and accurate user recommendation according to the user information after receiving the user information pushed by the server.

Figure 2:
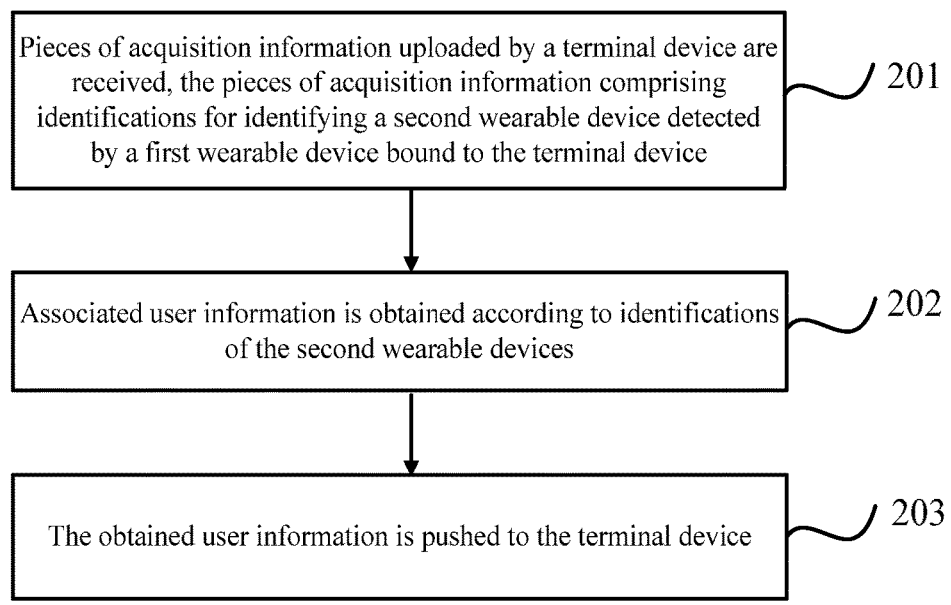
FIG. 2 is a flow chart of another method for acquiring user information according to an exemplary embodiment of the present disclosure.

FIG. 2 is a flow chart of a method for acquiring user information according to an exemplary embodiment of the present disclosure. The method for acquiring user information is applied in a server, the server may be a server device or a cloud platform (such as Xiaomi cloud) consisting of server devices. The method for acquiring user information includes the following steps.

In step 201, pieces of acquisition information uploaded by a terminal device are received, the pieces of acquisition information comprising identifiers of other wearable devices detected by a wearable device bound to the terminal device.

In this embodiment, in practice, the pieces of the acquisition information may comprise hardware IDs of other wearable devices detected by the wearable device bound to the terminal device as well as geographic location information of the wearable device bound to the terminal device when the other wearable devices are detected.

The hardware IDs may be configured to identify the other wearable devices uniquely. The identifiers of the other wearable devices may be identified according to the hardware IDs. For example, in practice, the hardware IDs may be discrete values generated by calculating and sampling MAC addresses of the other wearable devices. The geographic location information of the wearable device bound to the terminal device when the other wearable devices are detected may be obtained according to a positioning chip provided in the wearable device bound to the terminal device.

In step 202, associated user information is obtained according to identifiers of the other wearable devices.

In step 203, the obtained user information is pushed to the terminal device.

In this embodiment, the acquisition information of each wearable device may be previously associated with corresponding user information in the server. The server may query for the user information associated with the pieces of the acquisition information according to the identifiers (such as the hardware IDs) of the other wearable devices and then may push the queried user information to the terminal device.

For example, in practice, the user information may include social accounts of users of the other wearable devices and personal information disclosed by the users of the other wearable devices via a social application. The server may establish an association relationship between the pieces of the acquisition information and the user information by authorizing the users of the other wearable devices to log in the client software in the other wearable devices via the social accounts. If the users logs in the client software in the other wearable devices successfully via the social accounts, the server locally stores an association relationship between the social accounts and the client software in the other wearable devices. Once the association relationship between the social accounts and the client software in the other wearable devices is established, the server may obtain the personal information (such as a personal picture, personal data, etc.) disclosed on the social software by the users of the other wearable devices from a relevant server device according to the identifiers (such as the hardware IDs) of the other wearable devices, and may push the obtained user information to the terminal device.

Of course, in practice, other methods of associating the user information with the acquisition information on the server may be realized, which are not described herein.

In this embodiment, the server may also filter the pieces of the acquisition information according to a predetermined algorithm and extract an identifier corresponding to the predetermined algorithm when the server has obtained the user information associated with the pieces of the acquisition information according to the identifiers of the other wearable devices.

For example, since the terminal device uploads pieces of the acquisition information of the same wearable device detected at different positions or different time repeatedly and the number of times of any one of the pieces of the acquisition information being repeatedly uploaded is the number of times of the corresponding wearable device being detected. The server may calculate the number of times of an identifier in each piece of the received acquisition information being repeatedly uploaded and determine whether the number of times the identifier in each piece of the received acquisition information being repeatedly uploaded reaches a predetermined threshold, such as three times, when filtering the received acquisition information. If it is determined that the number of times an identifier in a piece of the acquisition information being repeatedly uploaded reaches the predetermined threshold, the piece of the acquisition information is extracted as a filtering result.

At this time, the filtering result comprises the acquisition information of such a wearable device that the number of times it being detected reaches the predetermined threshold. The acquisition information is the acquisition information of the wearable device that the user often encounters.

In this embodiment, the terminal device may perform a processing operation according to the user information after receiving the user information pushed by the server. For example, the terminal device may provide a user recommendation or perform a data analysis according to the user information.

The terminal device may perform the processing operation in different applications when performing the operation according to the user information.

For example, take providing a user recommendation according to the user information as an example, if the user information comprises the social accounts of the users of the other wearable devices and personal information disclosed by the users of the other wearable devices in the social application, the terminal device may define the user information as "people who is often encountered" and may recommend the user information in the social application corresponding to the social accounts or the client software in the wearable device bound to the terminal device to the user of the wearable device bound to the terminal device.

In addition, in practice, since a piece of acquisition information further comprises geographic location information of the wearable device bound to the terminal device when a surrounding wearable device is detected, the server may further push the geographic location information to the terminal device actively, such that the terminal device may display the geographic location information as "an encounter position" in addition to the above user information of the surrounding wearable device when providing the user recommendation in the social software or the client software in the wearable device bound to the terminal device.

In the above embodiment, by receiving pieces of acquisition information uploaded by a terminal device, querying for the user information associated with the pieces of acquisition information according to the pieces of acquisition information and pushing the queried user information to the terminal device, the terminal device may realize a more effective and accurate user recommendation according to the user information after receiving the user information pushed by the server.

Figure 3:
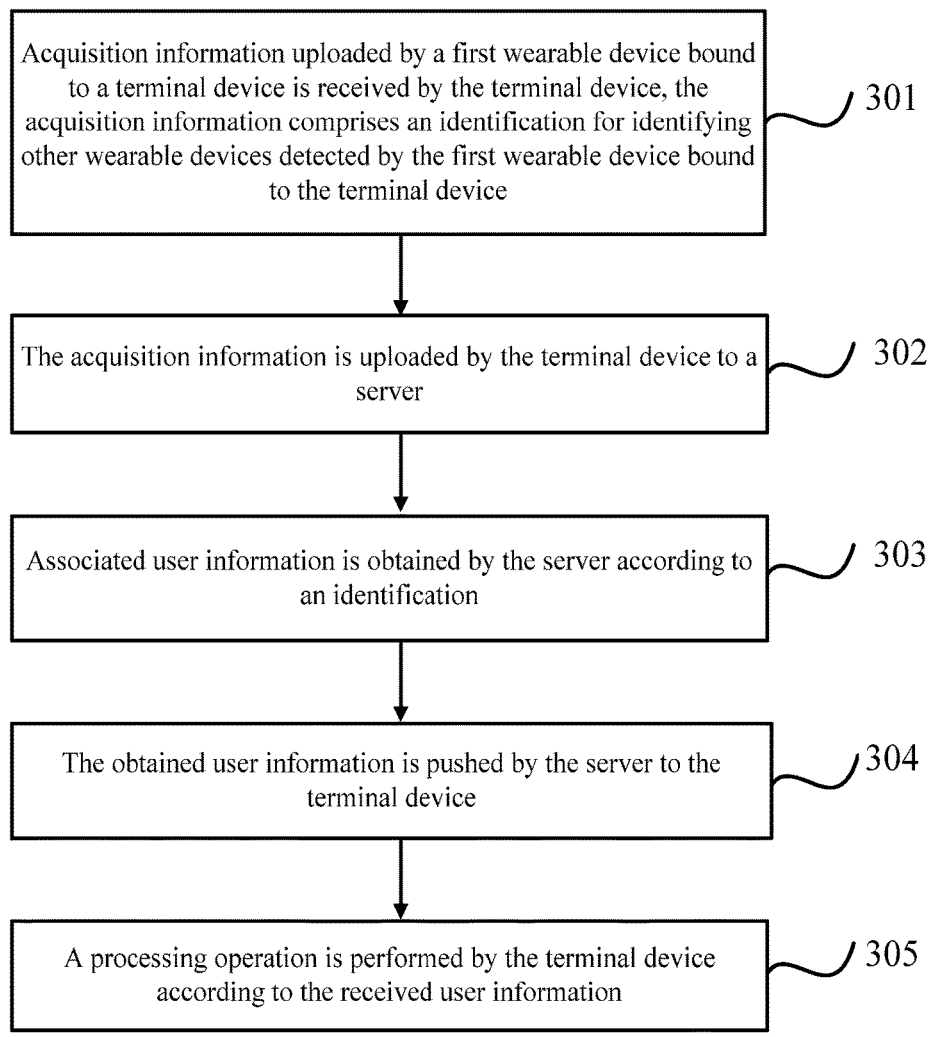
FIG. 3 is a flow chart of another method for acquiring user information according to an exemplary embodiment of the present disclosure.

FIG. 3 is a flow chart of a method for acquiring user information according to an exemplary embodiment of the present disclosure. The method for acquiring user information is applied in a terminal device. The method for acquiring user information includes the following steps.

In step 301, acquisition information uploaded by a first wearable device bound to a terminal device is received by the terminal device. The acquisition information comprises an identifier for identifying a second wearable device detected by the first wearable device bound to the terminal device.

In this embodiment, communication between wearable devices and a binding between a wearable device and a terminal device may be realized by a short distance wireless communication technology. For example, a wireless connection between the wearable devices may be established by NFC (Near Field Communication) technology, blue tooth technology, or WIFI technology or the like, and then the wearable devices may discover and detect each other based on the established wireless connection. The wearable device may communicate with client software preinstalled on the terminal device via the wireless connection, so as to establish a binding relationship with the terminal device.

For example, the wearable device may be a smart bracelet, the terminal device may be a smart phone. Wireless connections between smart bracelets may be established by blue tooth technology. The smart bracelets may discover and detect each other by monitoring a wireless signal of each other via the wireless connections. The smart phone may establish a wireless connection with the smart bracelet via a smart bracelet application preinstalled locally, so as to establish a binding relationship, and may perform a remote management on the smart bracelet via the smart bracelet application.

When detecting a second wearable device, the first wearable device may obtain acquisition information of the second wearable device and the acquisition information may comprise a hardware ID of the second wearable device detected by the first wearable device, or geographic location information of the first wearable device when the second wearable device is detected. The hardware ID is configured to identify the second wearable device uniquely, and an identifier of the second wearable device may be identified according to the hardware ID. For example, in practice, the hardware ID may be a discrete value generated by calculating and sampling a MAC address of the second wearable device. The geographic location information of the first wearable device when the second wearable device is detected may be obtained according to a positioning chip provided in the first wearable device.

In this embodiment, the first wearable device may further determine whether it is necessary to upload the acquisition information of the second wearable device to the terminal device by judging whether the distance between the first wearable device and the detected wearable device is less than a predetermined distance when the second wearable device is detected. For example, if the distance between the first wearable device and the detected wearable device is less than the predetermined distance, the acquisition information of the detected wearable device may be uploaded to a server. Conversely, if the distance between the first wearable device and the detected wearable device is greater than the predetermined distance, the acquisition information of the detected wearable device may not be uploaded. Pieces of acquisition information of the same wearable device detected at different positions or different time may be uploaded repeatedly. The predetermined distance is not specifically limited herein.

In step 302, the acquisition information is uploaded by the terminal device to a server.

In step 303, associated user information is obtained by the server according to an identifier.

In this embodiment, acquisition information of each wearable device may be previously associated with corresponding user information in the server. The server may query for the user information associated with the acquisition information according to the identifier (such as the hardware ID) of the second wearable device and then may push the queried user information to the terminal device.

For example, in practice, the user information may include a social account of a user of the second wearable device and personal information disclosed by the user of the second wearable device via a social application. The server establishes an association relationship between the acquisition information and the user information by authorizing the user of the second wearable device to log in the client software in the second wearable device via the social account. If the user of the second wearable device logs in the client software in the second wearable device successfully via the social account, the server locally stores an association relationship between the social account and the client software in the second wearable device. Once the association relationship between the social account and the client software in the second wearable device is established, the server may obtain the personal information (such as a personal picture, personal data, etc.) disclosed on the social application by the user of the second wearable device from a related server device according to the identifier (such as the hardware ID) of the second wearable device, and may push the obtained user information to the terminal device.

Of course, in practice, other methods of obtaining the user information associated with the acquisition information from the server may be realized, which are not in detailed described herein.

In this embodiment, the server may also filter pieces of the acquisition information according to a predetermined algorithm and extract an identifier corresponding to the predetermined algorithm when querying for the user information associated with the acquisition information according to the identifier of the other wearable devices.

For example, since the terminal device uploads pieces of the acquisition information of the same wearable device detected at different positions or different time repeatedly and a number of times of any one of the pieces of the acquisition information being repeatedly uploaded is the number of times the corresponding wearable device being detected. The server may calculate the number of times an identifier in each piece of the received acquisition information being repeatedly uploaded and determine whether the number of times of the identifier in each piece of the received acquisition information being repeatedly uploaded reaches a predetermined threshold, such as three times, when filtering the received acquisition information. If it is determined that the number of times an identifier in a piece of the acquisition information being repeatedly uploaded reaches the predetermined threshold, the piece of the acquisition information is extracted as a filtering result.

At this time, the filtering result comprises the acquisition information of such a wearable device that the number of times it being detected reaches the predetermined threshold. The acquisition information is the acquisition information of the wearable device that the user often encounters.

In step 304, the obtained user information is pushed by the server to the terminal device.

In step 305, a processing operation is performed by the terminal device according to the received user information.

In this embodiment, the terminal device may perform the processing operation according to the user information after receiving the user information pushed by the server. For example, the terminal device may provide a user recommendation or perform a data analysis according to the user information.

The terminal device may perform the processing operation in different applications when performing the operation according to the user information, i.e. different applications in the terminal device may share the user information.

For example, take providing a user recommendation according to the user information as an example, if the user information comprises the social account of the user of the second wearable device and personal information disclosed by the user of the second wearable device in the social application, the terminal device may define the user information as "people who is often encountered" and may recommend the user information in the social application corresponding to the social account or the client software in the first wearable device to the user of the first wearable device. On one hand, assuming that the social account is an account of the instant communication software "MiLiao", the terminal device may recommend the user of the second wearable device as "people who is often encountered" to the user of the first wearable device via the "MiLiao" software locally stored in the terminal device after receiving the user information of the second wearable device pushed by the server, or may recommend the user of the second wearable device as "special someone" to the user of the first wearable device in a situation that the user of the second wearable device is a friend of the user of the first wearable device. On the other hand, after the terminal device receives the user information of the second wearable device pushed by the server, since the user information is associated with the acquisition information, the terminal device may recommend the user of the second wearable device to the user of the first wearable device by defining the user of the second wearable device as "people who is often encountered" in the client software locally installed in the first wearable device.

In addition, in practice, since the acquisition information further comprises geographic location information of the wearable device bound to the terminal device when a surrounding wearable device is detected, the server may further push the geographic location information to the terminal device actively, such that the terminal device may display the geographic location information as "an encounter position" in addition to the above user information of the surrounding wearable device when providing the user recommendation in the social software or the client software in the wearable device bound to the terminal device.

In the above embodiment, the second wearable device are detected by the wearable device bound to the terminal device, and the acquisition information of the detected wearable device is uploaded to the terminal device, and then the terminal device uploads the acquisition information to the server. The server filters pieces of the acquisition information after receiving the pieces of the acquisition information uploaded by the terminal device. Meanwhile, since the acquisition information of each wearable device is previously associated with corresponding user information in the server, the server may obtain the user information associated with the acquisition information according to a filtering result obtained by filtering the pieces of the acquisition information, such that the terminal device may realize a more effective and accurate user recommendation according to the user information.

Corresponding to the embodiments of the above method for acquiring user information, the present disclosure further provides embodiments of a device for acquiring user information.

Figure 4:
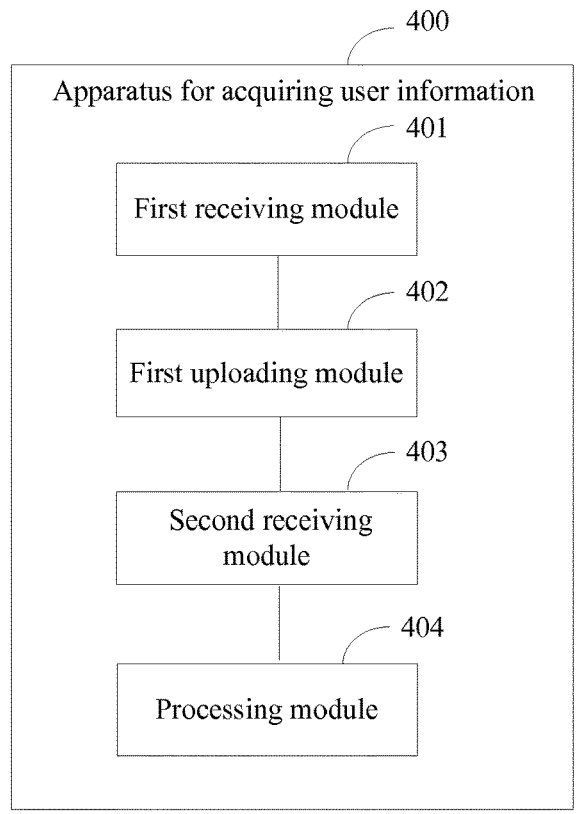
FIG. 4 is a block diagram of an apparatus for acquiring user information according to an exemplary embodiment of the present disclosure.

FIG. 4 is a block diagram of an apparatus for acquiring user information according to an exemplary embodiment of the present disclosure.

As shown in FIG. 4, an apparatus 400 for acquiring user information according to an exemplary embodiment includes a first receiving module 401, a first uploading module 402, a second receiving module 403 and a processing module 404.

The first receiving module 401 is configured to receive acquisition information uploaded by a first wearable device bound. Herein the acquisition information comprises an identifier for identifying a second wearable device detected by the first wearable device.

The first uploading module 402 is configured to upload the acquisition information to a server.

The second receiving module 403 is configured to receive the user information pushed by the server. Herein the user information is obtained by the server according to the identifier and is associated with the acquisition information.

The processing module 404 is configured to perform a processing operation according to the user information.

In this embodiment, the acquisition information may further comprise geographic location information of the first wearable device when the second wearable device is detected. The user information may comprise a social account of a user of the second wearable device, and personal information disclosed by the user of the second wearable device via a social application.

In the above embodiment, by receiving the acquisition information uploaded by a bound wearable device, uploading the acquisition information to a server, querying for the user information associated with the acquisition information by the server, and pushing the queried user information to the terminal device, the terminal device may realize a more effective and accurate user recommendation according to the user information after receiving the user information pushed by the server.

Figure 5:
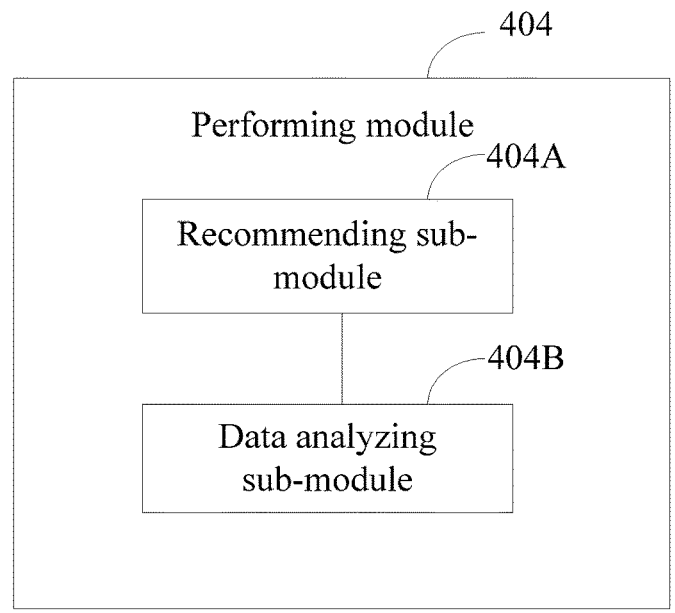
FIG. 5 is a block diagram of another apparatus for acquiring user information in a terminal according to an exemplary embodiment of the present disclosure.

FIG. 5 is a block diagram of another device for acquiring user information according to an exemplary embodiment of the present disclosure. In this embodiment, based on the embodiment shown in FIG. 4, the processing module 404 includes a recommending sub-module 404A and a data analyzing sub-module 404B.

The recommending sub-module 404A is configured to recommending a user according to the user information.

The data analyzing sub-module 404B is configured to perform a data analysis according to the user information.

Figure 6:
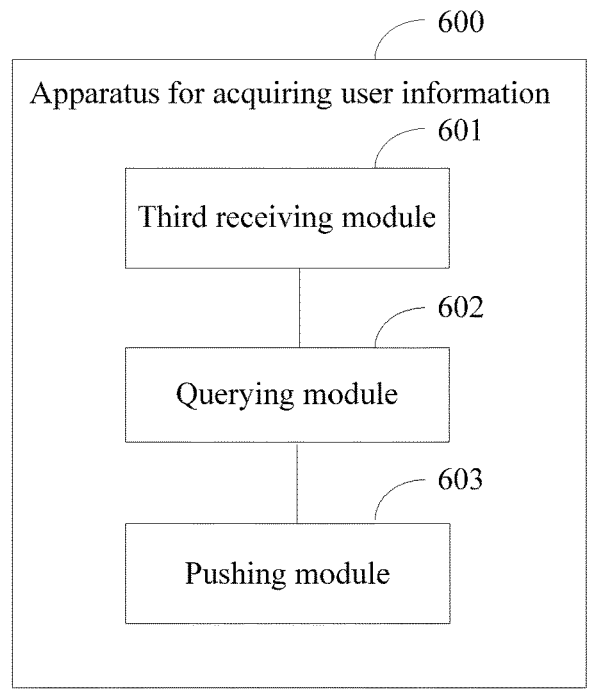
FIG. 6 is a block diagram of another apparatus for acquiring user information according to an exemplary embodiment of the present disclosure.

FIG. 6 is a block diagram of an apparatus for acquiring user information according to an exemplary embodiment of the present disclosure.

As shown in FIG. 6, an apparatus 600 for acquiring user information according to an exemplary embodiment includes a third receiving module 601, a querying module 602 and a pushing module 603.

The third receiving module 601 is configured to receive pieces of acquisition information uploaded by a terminal device. Herein the pieces of the acquisition information comprise identifiers for identifying other wearable devices detected by a wearable device bound to the terminal device.

The querying module 602 is configured to query for the user information according to the identifiers for identifying the other wearable devices.

The pushing module 603 is configured to push the user information to the terminal device.

In the above embodiment, by receiving pieces of the acquisition information uploaded by a terminal device, querying for the user information associated with the pieces of the acquisition information according to the pieces of the acquisition information and pushing the queried user information to the terminal device, the terminal device may realize a more effective and accurate user recommendation according to the user information after receiving the user information pushed by the server.

Figure 7:
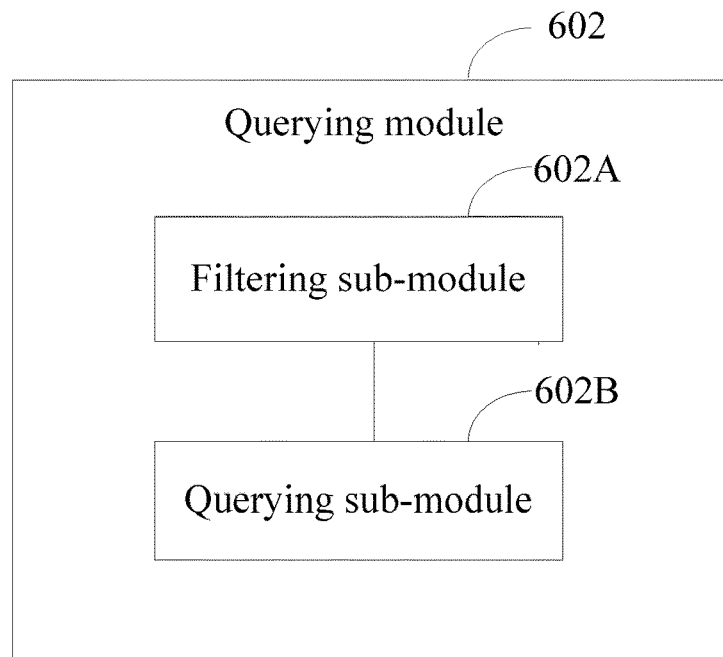
FIG. 7 is a block diagram of another apparatus for acquiring user information according to an exemplary embodiment of the present disclosure.

FIG. 7 is a block diagram of another apparatus for acquiring user information according to an exemplary embodiment of the present disclosure. In this embodiment, based on the embodiment shown in FIG. 6, the querying module 602 includes a filtering sub-module 602A and a querying sub-module 602B.

The filtering sub-module 602A is configured to filter the pieces of the acquisition information according to a predetermined algorithm to extract an identifier corresponding to the predetermined algorithm as a filtering result.

The querying sub-module 602B is configured to query for the user information associated with the filtering result according to the identifiers for identifying the other wearable devices.

Figure 8:
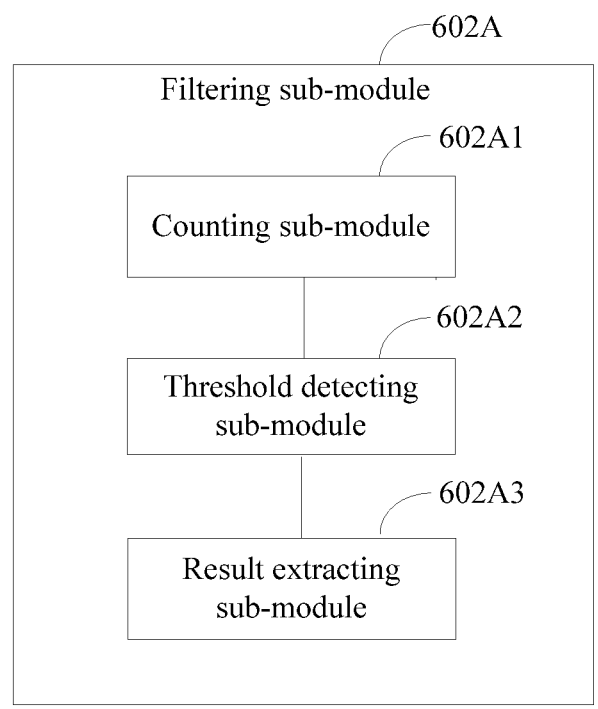
FIG. 8 is a block diagram of another apparatus for acquiring user information according to an exemplary embodiment of the present disclosure.

FIG. 8 is a block diagram of another apparatus for acquiring user information according to an exemplary embodiment of the present disclosure. In this embodiment, based on the embodiment shown in FIG. 7, the filtering sub-module 602A further includes a counting sub-module 602A1, a threshold detecting sub-module 602A2 and a result extracting sub-module 602A3.

The counting sub-module 602A1 is configured to count a number of times an identifier in any one of the pieces of the acquisition information being repeatedly uploaded.

The threshold detecting sub-module 602A2 is configured to detect whether the number of times reaches a predetermined threshold.

The result extracting sub-module 602A3 is configured to extract the identifier in such a piece of the acquisition information as the filtering result that the number of times the piece of the acquisition information being repeatedly uploaded reaches the predetermined threshold.

Concerning the implementation process of the function and action of each module in the above apparatus, reference is made to the implementation process of corresponding steps in the above method, which will not be elaborated herein.

Since the apparatus embodiments substantially correspond to the method embodiments, concerning related parts of the apparatus embodiments, reference is made to corresponding parts of the method embodiments. The apparatus embodiments described above are merely exemplary, units illustrated as separate components may be or may not be physically separated, components displayed as units may be or may not be physical units, i.e. may be located in the same place, and may also be distributed on a plurality of network units. A part or all of the modules may be selected according to practical needs so as to achieve the object of the solution of the present disclosure, which may be understood and implemented by those skilled in the art without creative labor.

Accordingly, the present disclosure further provides a terminal device for acquiring user information, including: a memory and one or more programs stored in the memory, and configured so that one or more processors execute instructions of performing the following operations contained in the one or more programs: receiving acquisition information uploaded by a first wearable device bound. Herein the acquisition information comprises an identifier for identifying a second wearable device detected by the first wearable device; uploading the acquisition information to a server; receiving the user information pushed by the server, wherein the user information is obtained by the server according to the identifier and is associated with the acquisition information; and performing an operation according to the user information.

Accordingly, the present disclosure further provides a server for acquiring user information, including: a memory, and one or more programs stored in the memory and is configured so that one or more processors execute instructions of performing the following operations contained in the one or more programs: receiving pieces of acquisition information uploaded by a terminal device, wherein the pieces of the acquisition information comprise identifiers for identifying other wearable devices detected by a wearable device bound to the terminal device; querying for the user information according to the identifiers for identifying the other wearable devices; and pushing the user information to the terminal device.

Figure 9:
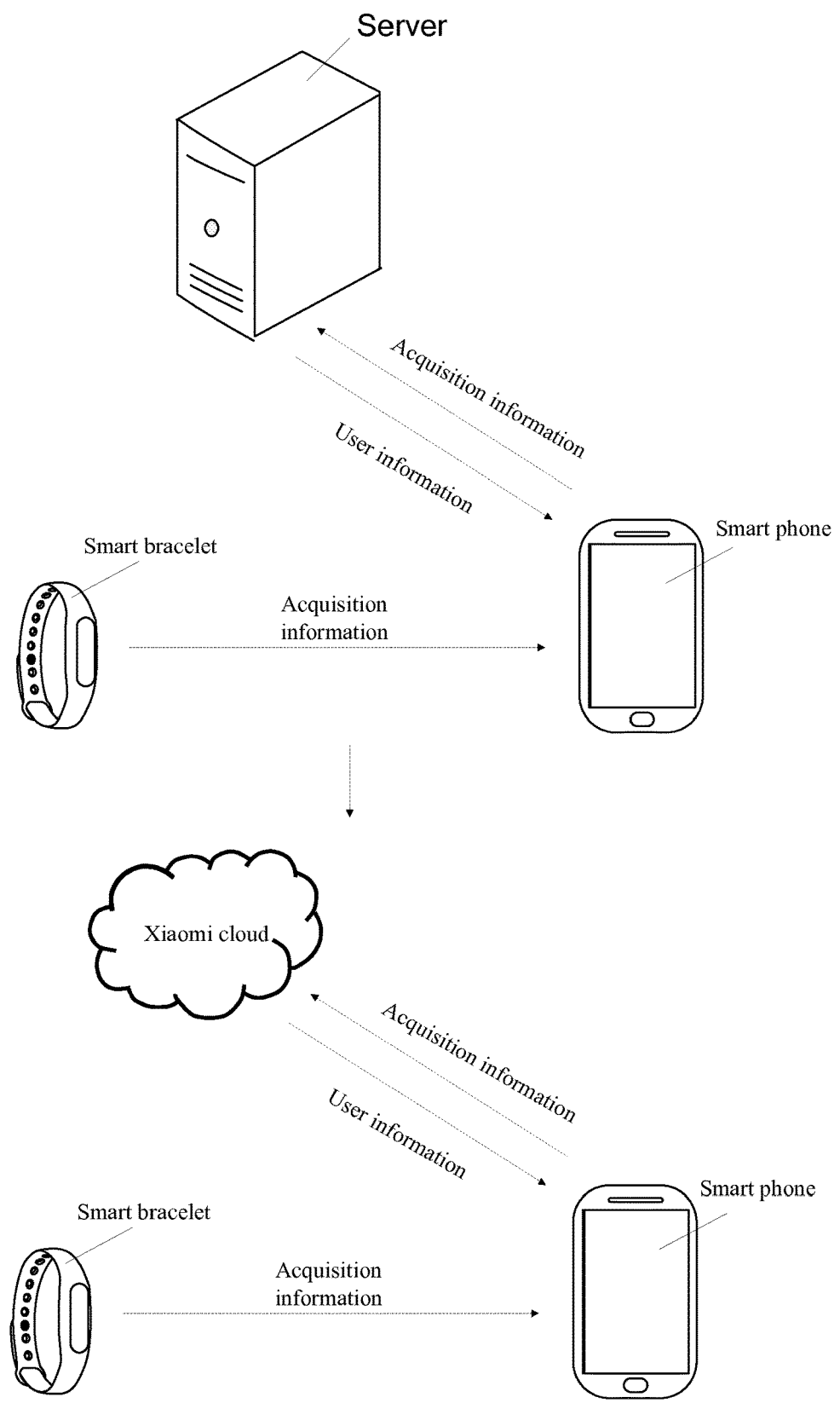
FIG. 9 is a block diagram of a system for acquiring user information according to an exemplary embodiment of the present disclosure.

FIG. 9 is a block diagram of a system for acquiring user information according to an exemplary embodiment.

As shown in FIG. 9, a system for acquiring user information according to an exemplary embodiment includes a terminal device, a server and a wearable device bound to the terminal device.

The wearable device may be a smart bracelet, and the terminal device may be a smart phone including an apparatus in embodiments corresponding to FIGS. 4-5.

The server may be a server device or a cloud platform (such as Xiaomi cloud) consisting of server devices including an apparatus in embodiments corresponding to FIGS. 6-8.

In the above embodiment, the other wearable devices are detected by the wearable device bound to the terminal device, and the acquisition information of the detected wearable device is uploaded to the terminal device, and then the terminal device uploads the acquisition information to the server. The server filters pieces of the acquisition information after receiving the pieces of the acquisition information uploaded by the terminal device. Meanwhile, since the acquisition information of each wearable device is previously associated with corresponding user information in the server, the server may obtain the user information associated with the acquisition information according to a filtering result after filtering the pieces of the acquisition information, such that the terminal device may realize a more effective and accurate user recommendation according to the user information.

Figure 10:
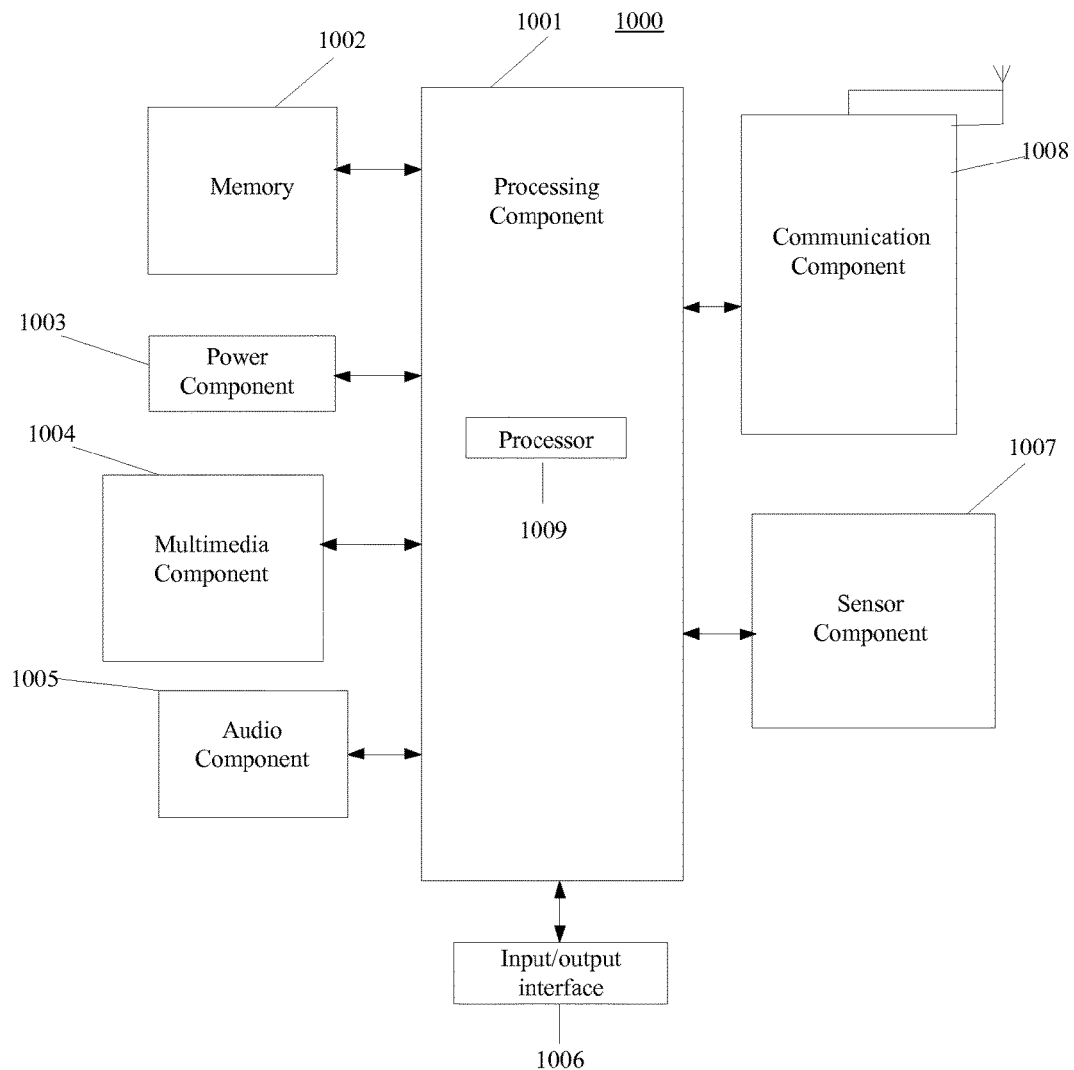
FIG. 10 is a block diagram of a terminal device for acquiring user information according to an exemplary embodiment of the present disclosure.

FIG. 10 is a block diagram of a terminal device 1000 for acquiring user information according to an exemplary embodiment. For example, the terminal device 1000 may be a computer, a mobile phone, a digital broadcast terminal, a messaging device, a gaming console, a tablet, a medical device, an exercise equipment, a personal digital assistant, and the like.

Referring to FIG. 10, the terminal device 1000 may include one or more of the following components: a processing component 1001, a memory 1002, a power component 1003, a multimedia component 1004, an audio component 1005, an input/output (I/O) interface 1006, a sensor component 1007, and a communication component 1008.

The processing component 1001 typically controls overall operations of the terminal device 1000, such as the operations associated with display, telephone calls, data communications, camera operations, and recording operations. The processing component 1001 may include one or more processors 1009 to execute instructions to perform all or part of the steps in the above described methods. Moreover, the processing component 1001 may include one or more modules which facilitate the interaction between the processing component 1001 and other components. For instance, the processing component 1001 may include a multimedia module to facilitate the interaction between the multimedia component 1004 and the processing component 1001.

The memory 1002 is configured to store various types of data to support the operation of the terminal device 1000. Examples of such data include instructions for any applications or methods operated on the terminal device 1000, contact data, phonebook data, messages, pictures, videos, etc. The memory 1002 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1003 provides power to various components of the terminal device 1000. The power component 1003 may include a power management system, one or more power sources, and any other components associated with the generation, management, and distribution of power in the terminal device 1000.

The multimedia component 1004 includes a screen providing an output interface between the terminal device 1000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1004 includes a front camera and/or a rear camera. The front camera and the rear camera may receive an external multimedia datum while the terminal device 1000 is in an operation mode, such as a photographing mode or a video mode. Each of the front camera and the rear camera may be a fixed optical lens system or have focus and optical zoom capability.

The audio component 1005 is configured to output and/or input audio signals. For example, the audio component 1005 includes a microphone (MIC) configured to receive an external audio signal when the terminal device 1000 is in an operation mode, such as a call mode, a recording mode, and a voice recognition mode. The received audio signal may be further stored in the memory 1002 or transmitted via the communication component 1008. In some embodiments, the audio component 1005 further includes a speaker to output audio signals.

The I/O interface 1006 provides an interface between the processing component 1001 and peripheral interface modules, such as a keyboard, a click wheel, buttons, and the like. The buttons may include, but are not limited to, a home button, a volume button, a starting button, and a locking button.

The sensor component 1007 includes one or more sensors to provide status assessments of various aspects of the terminal device 1000. For instance, the sensor component 1007 may detect an open/closed status of the terminal device 1000, relative positioning of components, e.g., the display and the keypad of the terminal device 1000, a change in position of the terminal device 1000 or a component of the terminal device 1000, a presence or absence of user contact with the terminal device 1000, an orientation or an acceleration/deceleration of the terminal device 1000, and a change in temperature of the terminal device 1000. The sensor component 1007 may include a proximity sensor configured to detect the presence of nearby objects without any physical contact. The sensor component 1007 may also include a light sensor, such as a CMOS or CCD image sensor, for use in imaging applications. In some embodiments, the sensor component 1007 may also include an accelerometer sensor, a gyroscope sensor, a magnetic sensor, a pressure sensor, or a temperature sensor.

The communication component 1008 is configured to facilitate communication, wired or wirelessly, between the terminal device 1000 and other devices. The terminal device 1000 can access a wireless network based on a communication standard, such as WiFi, 2G, or 3G, or a combination thereof. In one exemplary embodiment, the communication component 1008 receives a broadcast signal or broadcast associated information from an external broadcast management system via a broadcast channel. In one exemplary embodiment, the communication component 1008 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the terminal device 1000 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1002, executable by the processor 1009 in the terminal device 1000, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is provided. When instructions in the storage medium are executed by a processor of a mobile terminal, the mobile terminal may perform a method for acquiring user information. The method includes: receiving acquisition information uploaded by a first wearable device bound. Herein the acquisition information comprises an identifier for identifying a second wearable device detected by the first wearable device; uploading the acquisition information to a server; receiving the user information pushed by the server. Herein the user information is obtained by the server according to the identifier and is associated with the acquisition information; and performing an operation according to the user information.

Accordingly, the present disclosure further provides another device for acquiring user information, including: a memory and one or more programs stored in the memory, and is configured so that one or more processors execute instructions of performing the following operations contained in the one or more programs: receiving pieces of acquisition information uploaded by a terminal device. Herein the pieces of acquisition information comprise identifiers for identifying other wearable devices detected by a wearable device bound to the terminal device; querying for the user information according to the identifiers for identifying the other wearable devices; pushing the user information to the terminal device.

Figure 11:
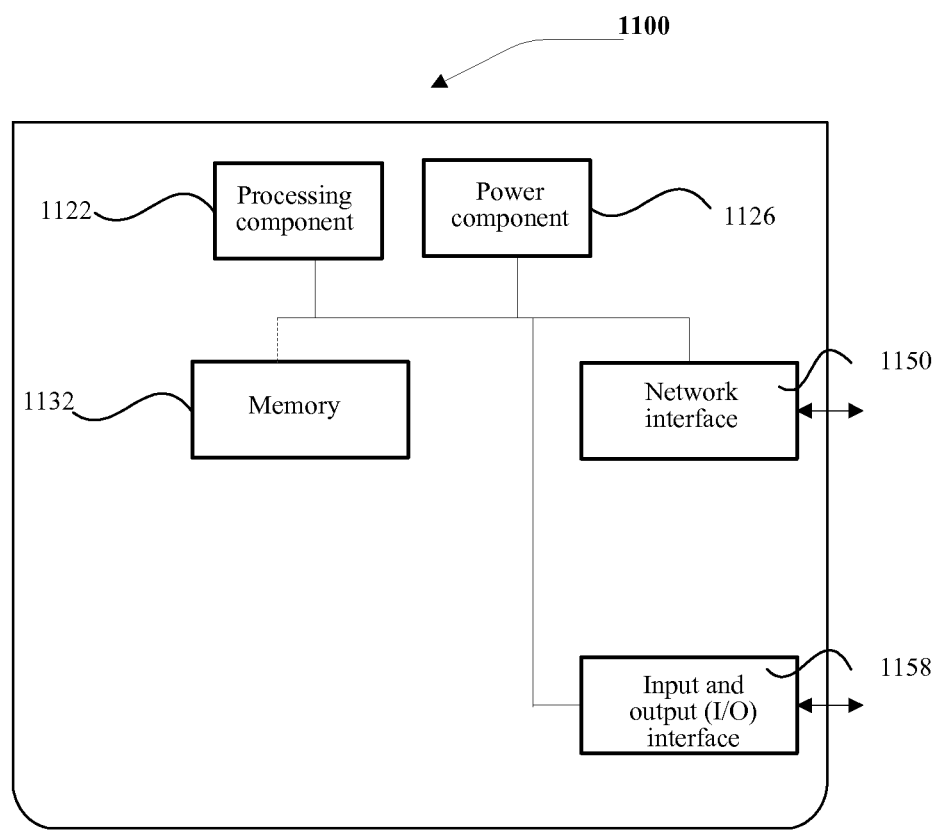
FIG. 11 is a block diagram of a server for acquiring user information according to an exemplary embodiment of the present disclosure.
Figure 12:
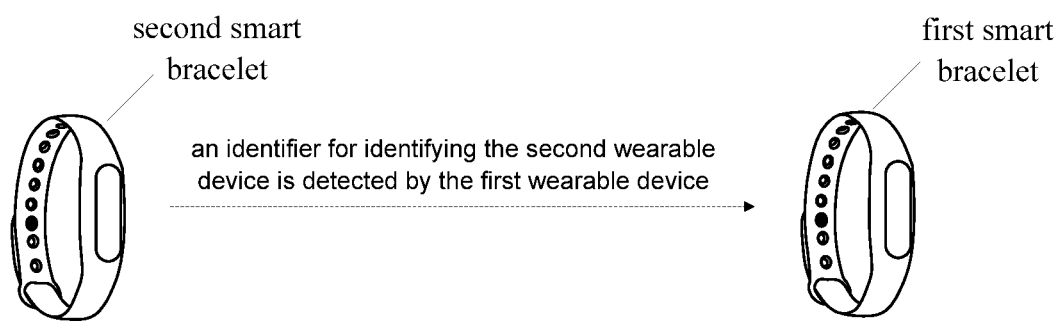
FIG. 12 is a schematic view showing a first smart bracelet, a second smart bracelet and their relationship according to an exemplary embodiment of the present disclosure.

FIG. 11 is a block diagram of a server 1100 for acquiring user information according to an exemplary embodiment of the present disclosure. For example, the server 1100 may be provided as a server. Referring to FIG. 11, the server 1100 may include a processing component 1122 including one or more processors, and a memory resource represented by a memory 1132 for storing instructions (such as application programs) executable by the processing component 1122. The application programs stored in the memory 1132 may include one or more modules, and each module may correspond to a series of instructions. Furthermore, the processing component 1122 may be configured to execute the instructions so as to perform the above-mentioned method for acquiring user information.

The server 1100 may further include a power component 1126 configured to perform a power management of the server 1100, a wired or wireless network interface 1150 configured to connect the server 1100 to the internet, and an input and output (I/O) interface 1158. The server 1100 may operate an operating system stored in the memory 1132, such as Windows Server™, Mac OS X™, Unix™, Linux™, FreeBSD™ and so on.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for acquiring user information in a terminal device, comprising:

receiving acquisition information uploaded by a first wearable device bound to the terminal device, wherein the acquisition information comprises an identifier for identifying a second wearable device detected by the first wearable device;

uploading the acquisition information to a server when a distance between the first wearable device and the second wearable device is shorter than a predetermined distance;

receiving the user information pushed by the server when the identifier in the currently received acquisition information has been repeatedly uploaded for a number of times which reaches a predetermined threshold, wherein the user information is obtained by the server according to the identifier and is associated with the acquisition information; and performing a processing operation according to the user information.

2. The method according to claim 1, wherein performing the processing operation according to the user information comprises:

providing a recommendation according to the user information.

3. The method according to claim 1, wherein performing the processing operation according to the user information comprises:

performing a data analysis according to the user information.

4. The method according to claim 1, wherein the acquisition information further comprises geographical location information of the first wearable device when the second wearable device is detected by the first wearable device.

5. A method for acquiring user information in a server, comprising:

receiving pieces of acquisition information uploaded by a terminal device, wherein each piece of the acquisition information comprises an identifier for identifying a second wearable device detected by a first wearable device bound to the terminal device and each piece of acquisition information is uploaded when a distance between the first wearable device and the second wearable device is less than a predetermined distance;

filtering the pieces of the acquisition information according to a predetermined algorithm to obtain filtered acquisition information;

extracting an identifier from the filtered acquisition information;

querying for the user information associated with the filtered acquisition information according to the extracted identifier; and pushing the user information to the terminal device.

6. The method according to claim 5, wherein filtering the pieces of the acquisition information according to the predetermined algorithm to obtain filtered acquisition information comprises:

calculating for an identifier a number of times the identifier is uploaded repeatedly with the pieces of acquisition information by the terminal device;

determining whether the number of times for the identifier reaches a predetermined threshold; and when the number of times for the identifier reaches the predetermined threshold, extracting the pieces of acquisition information comprising the identifier as the filtered acquisition information.

7. A terminal device for acquiring user information, comprising:

a processor;

a memory configured to store instructions executable by the processor;

wherein the processor is configured to perform:

receiving acquisition information uploaded by a first wearable device bound to the terminal device, wherein the acquisition information comprises an identifier for identifying a second wearable device detected by the first wearable device;

uploading the acquisition information to a server when a distance between the first wearable device and the second wearable device is shorter than a predetermined distance;

receiving the user information pushed by the server when the identifier in the currently received acquisition information has been repeatedly uploaded for a number of times which reaches a predetermined threshold, wherein the user information is obtained by the server according to the identifier and is associated with the acquisition information; and performing a processing operation according to the user information.

8. The terminal device according to claim 7, wherein performing the processing operation according to the user information comprises:

providing a recommendation according to the user information.

9. The terminal device according to claim 7, wherein performing the processing operation according to the user information comprises:

performing a data analysis according to the user information.

10. The terminal device according to claim 7, wherein the acquisition information further comprises geographical location information of the first wearable device when the second wearable device is detected by the first wearable device.

11. A server for acquiring user information, comprising:

a processor;

a memory configured to store instructions executable by the processor;

wherein the processor is configured to perform:

receiving pieces of acquisition information uploaded by a terminal device, wherein each piece of the acquisition information comprise an identifier for identifying a second wearable device detected by a first wearable device bound to the terminal device and each piece of acquisition information is uploaded when a distance between the first wearable device and the second wearable device is less than a predetermined distance;

filtering the pieces of the acquisition information according to a predetermined algorithm to obtain filtered acquisition information;

extracting an identifier from the filtered acquisition information;

querying for the user information associated with the filtered acquisition information according to the extracted identifier; and pushing the user information to the terminal device.

12. The server according to claim 11, wherein filtering the pieces of the acquisition information according to the predetermined algorithm to obtain filtered acquisition information comprises:

calculating for an identifier a number of times for the identifier is uploaded repeatedly with the pieces of acquisition information by the terminal device;

determining whether the number of times for the identifier reaches a predetermined threshold; and when the number of times for the identifier reaches the predetermined threshold, extracting the pieces of acquisition information comprising the identifier as the filtered acquisition information.

* * * * *